May 6, 1958 P. FRANCOIS 2,833,562
COUPLING DEVICE FOR THE LIFTING AND TRANSPORTING OF LOADS
Filed July 29, 1955 3 Sheets-Sheet 1

INVENTOR.
Paul Francois.
BY
Maxwell E. Sparrow.
ATTORNEY.

May 6, 1958    P. FRANCOIS    2,833,562
COUPLING DEVICE FOR THE LIFTING AND TRANSPORTING OF LOADS
Filed July 29, 1955    3 Sheets-Sheet 2

INVENTOR.
Paul Francois.
BY
Maxwell E. Sparrow.
ATTORNEY.

May 6, 1958          P. FRANCOIS          2,833,562

COUPLING DEVICE FOR THE LIFTING AND TRANSPORTING OF LOADS

Filed July 29, 1955          3 Sheets-Sheet 3

INVENTOR.
Paul Francois
BY
Maxwell E. Sparrow.
ATTORNEY.

United States Patent Office 2,833,562
Patented May 6, 1958

2,833,562

COUPLING DEVICE FOR THE LIFTING AND TRANSPORTING OF LOADS

Paul Francois, Miraumont, France

Application July 29, 1955, Serial No. 525,257

Claims priority, application France December 23, 1954

8 Claims. (Cl. 280—479)

This invention relates to devices for the lifting and handling of articles or loads.

It is an object of the present invention to provide an apparatus which may be coupled to the load, such as a trailer, and to the driving vehicle, which apparatus is operable by its own power for the intended purpose.

A further object of the present invention is to provide a coupling device normally having contact with the ground and moving parts adjustable by a power plant contained therein to connect the device with the load and the driving vehicle and then be raised by its power plant off the ground.

A still further object of the present invention is to provide such a coupling device in which the power plant comprises a hydraulic jack.

Still another object of this invention is to provide a coupling device of great convenience and simplicity for the purpose described, enabling the lifting of a mass or load without the execution of complex horizontal and vertical movements such as would be required if lifting were to be effected by means of a mobile crane, and adapted to be incorporated in structures of moderate height which can readily pass under bridges, overhanging trees or overhead wires.

A feature of the present invention resides in the provision of an elongated body or arm having a front extremity adapted for coupling engagement with the rear end of a driving vehicle or tractor and having a rear extremity adapted for similar engagement with the front end of a trailer or load, this arm being fulcrumed on an axle supported by at least one wheel. Pivotally connected with the arm, preferably near its said rear extremity, is a stop member which may be in the form of a panel and is adapted to bear upon the forward end of the trailer. An actuating device with relatively displaceable parts, such as a hydraulic jack, is anchored to both the arm and the stop member and operable to change the angle between these two elements so as to swing the arm about its wheel axle, in a sense tending to lower its front end and to raise its rear end, whereby the forward extremity of the arm is brought into coupling engagement with the tractor and the rear extremity is caused to engage the trailer and to lift up the front end of the latter. It should be noted that the arrangement just described may be reversed, with the stop member or panel bearing upon tractor rather than upon the trailer.

This assembly is preferably complemented by a panel-blocking device, constituted, for example, by a brace articulated on the panel, which engages a projection or a stop on the arm when the hydraulic jack is extended, thereby relieving the latter and allowing release of the oil pressure in the hydraulic jack.

Various further and more specific objects, purposes, features and advantages will clearly appear from the detailed description given below taken in connection with the accompanying drawings which form a part of this specification and illustrate merely by way of examples certain embodiments and variations of the device of the invention.

The invention consists in such novel features, arrangements and combinations of parts as may be shown and described in connection with the apparatus herein disclosed by way of example only and as illustrative of preferred embodiments of the system.

In the following description and in the claims, parts will be identified by specific names for convenience, but such names are intended to be as generic in their application to similar parts as the art will permit. Like reference characters denote like parts in the several figures of the drawings.

In the drawings:

Figs. 1 to 4 diagrammatically show the device with its arm at various stages of its operation;

Figure 1:
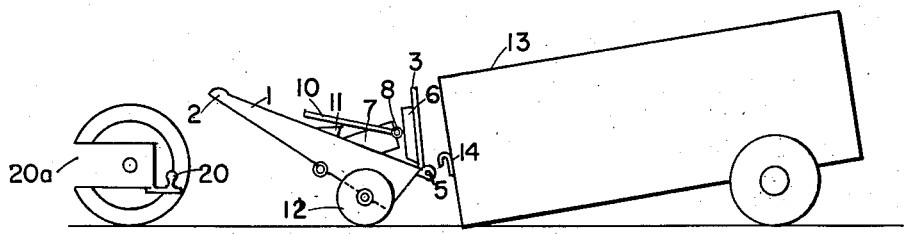
Figure 5:
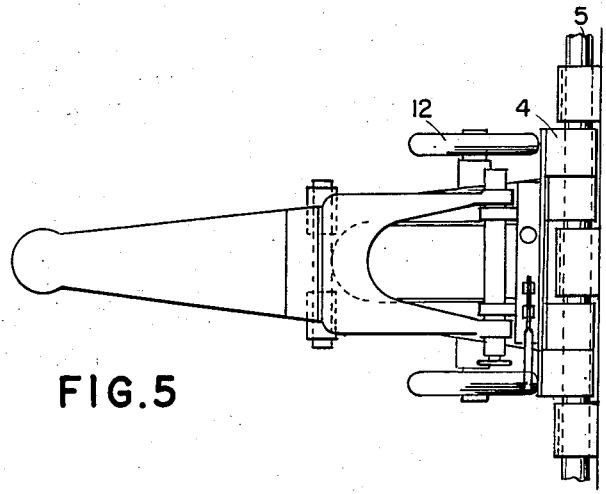
Fig. 5 is a top view of the device.
Figure 8:
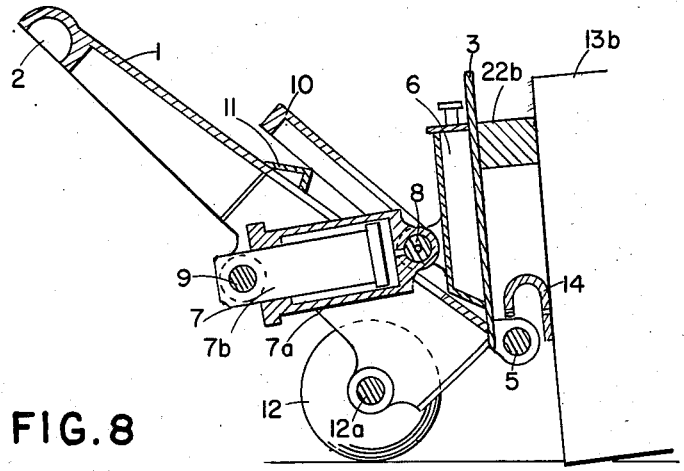
Figs. 8 and 10 are sectional views of the device depicted in Figs. 1 to 4.

Referring now more particularly to the drawings, Fig. 1 shows the body or arm 1 of the device in the position it occupies before being attached to the load which, in this instance, is a trailer 13 having rear wheels 13a. Arm or trunk 1 is fitted at the end nearest the driving vehicle 20a with a hook 2, a ring (not shown) or any other suitable coupling member. At the other end of arm 1 there is a panel 3 which is swingably connected or articulated to arm 1 by means of bearing rings 4, 4' (Figs. 5, 8) mounted on shaft 5. Attached to panel 3 is a hydraulic pump 6 feeding a jack 7 the housing 7a of which is swingably connected or articulated to a shaft 8 mounted on pump 6, or on panel 3, and the piston 7b of which is swingably and permanently connected to arm 1 as indicated by the numeral 9. The shaft 8 also serves as articulation to a brace 10 which, when the arm 1 is in raised position, engages a projection 11 fixed to arm or trunk 1. Arm 1 is supported by at least one wheel or caster 12 and fulcrumed on the axle 12a thereof. The trailer 13 is provided with at least one hook 14, or any other suitable attachment, at its front.

Figure 2:
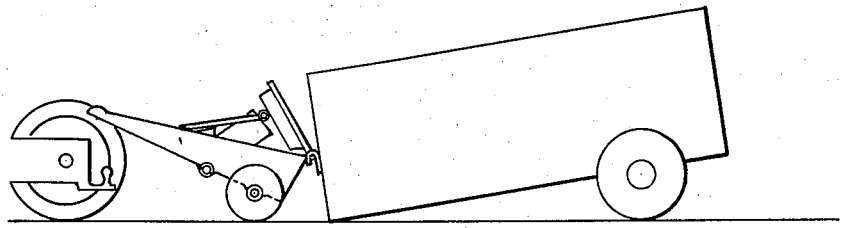
Figure 3:
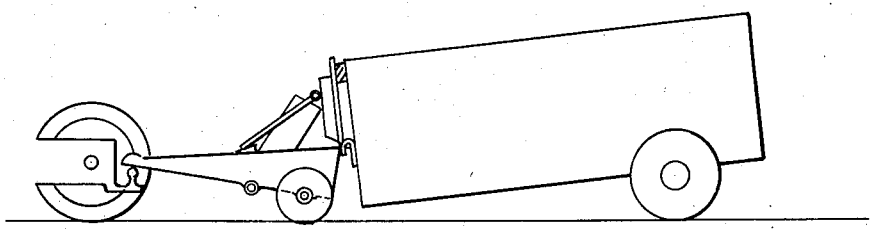
Figure 4:
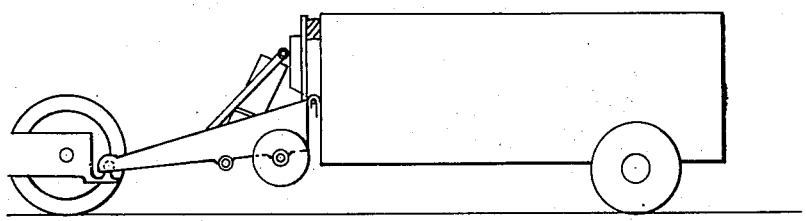

The operation of the coupling device embodying the invention is as follows:

The front of trailer 13 (without its load) to be lifted, fitted with the hook 14, is in position at the rear of the said coupling device and the driving vehicle is at the front thereof. The arm or shaft 5 is brought under hook 14, then the hydraulic pump 6 is activated to operate jack 7, causing the lowering of end 2 of the arm 1 and the raising of panel 3 (Fig. 2). As the movement continues, panel 3 is applied by means of an interposed block 22b against the front of the trailer 13 which begins to lift (Fig. 3). The downward movement of arm 1 continues and its end 2 presses against the fixed member 20 of the driving vehicle 20a. The panel 3, which also tends to continue its upward movement, presses strongly against the trailer 13, and the reaction of this effort provokes the lifting of the rear of arm 1 which leaves the ground, raising with it the front of trailer 13 (Fig. 4).

Bolts 15 (Fig. 9) may be fitted to hooks 14 to close them and thus prevent the raised trailer 13 from breaking away from arm 1.

Figure 9:
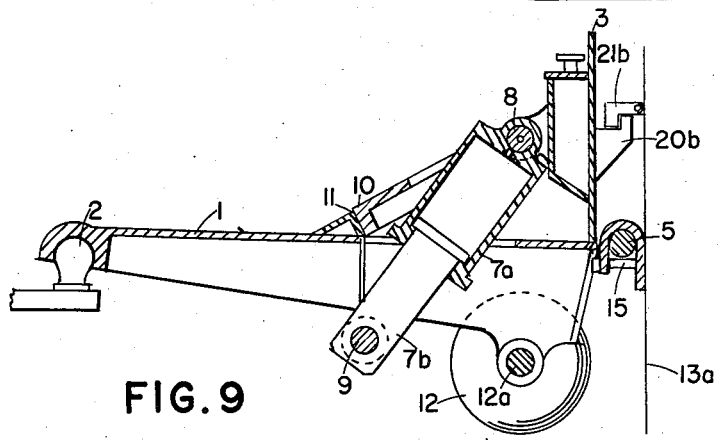
Fig. 9 is a sectional view of the device in a further modified form.
Figure 10:
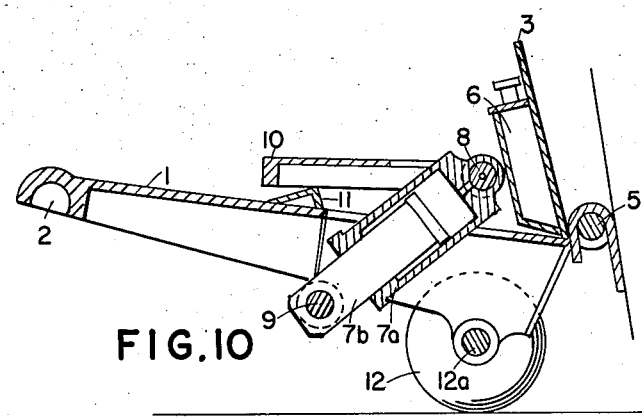

The coupling between the panel and the mass or trailer can be constituted, as seen in Fig. 9 (corresponding to the position seen in Fig. 4), by a fixed part 20b made solid with plate 3, and a mobile part 21b, articulated to the trailer wall 13b, which, by its own weight or under the action of a spring (not shown), automatically hooks to the fixed part 20b when arm 1 is in the position to raise the trailer 13. Naturally, the reversed arrangement may be adopted, the fixed part being solid with trailer 13 and the mobile part solid with the plate 3.

Figure 6:
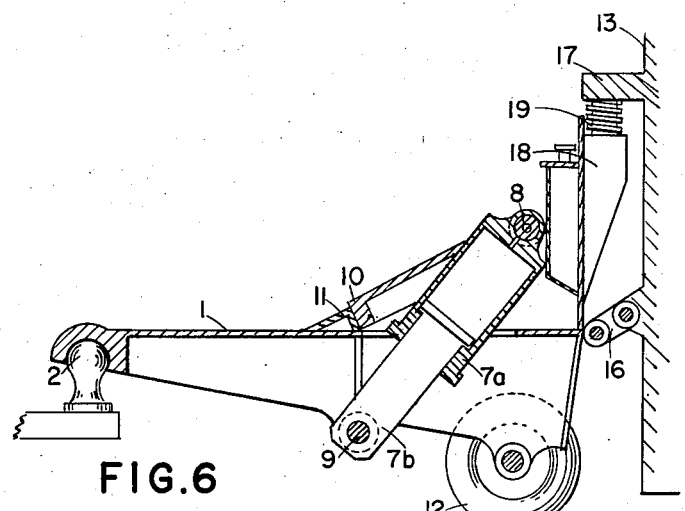
Fig. 6 is a sectional view of the device in one modified form.

Fig. 6 shows a variation in which the system of hooks 14 is replaced by twin coupling 16, and in which, furthermore, the load or trailer 13 has a projection 17 which is connected to a piece 18, fixed to panel 3, by means of a spring 19. This arrangement insures great flexibility and great smoothness to the assembly of the device.

A coil spring, giving elasticity to the unit, may be inserted between plunger 7b and housing 7a of jack 7.

Figure 7:
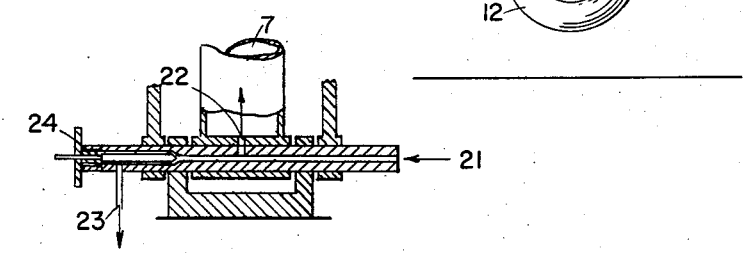
Fig. 7 is a sectional detail view of the oil circuit feeding the jack through its axis of articulation.

Fig. 7 shows a part of the oil circulation circuit, wherein, in this case, the oil arrives through the tubing 21, directly feeds the jack 7 through orifice 22, and can, if desired, feed another jack through tubing 23 which can be cut off by valve 24.

While the invention has been described with respect to a particular preferred embodiment with some variations, which give satisfactory results, it will be understood by those skilled in the art after understanding the invention, that various changes and modifications may be made without departing from the spirit and scope of the invention and it is intended, therefore, in the appended claims to cover all such changes and modifications.

Having thus described the invention, what is claimed as new and desired to be secured by Letters Patent is:

1. A device for coupling together two vehicles including a tractor and a trailer, said trailer having a wheel-supported rear end and a front end supported by the tractor in the coupled condition of said vehicles, comprising an axle with at least one wheel, an elongated body fulcrumed on said axle, a stop member pivotally connected with said body for relative movement about a horizontal axis and adapted to bear upon said trailer, actuating means having a pair of relatively displaceable parts anchored to said stop member and to said body, respectively, said actuating means being operable to swing said body around said axle relative to said stop member, first hitching means on a point of said body remote from said axle for coupling said body to said tractor at the end of its swinging movement about said axle, and second hitching means on a portion of said body rising during said swinging movement for coupling said portion to the front end of said trailer and lifting said front end by said movement.

2. A device according to claim 1, wherein said actuating means comprises a hydraulic jack.

3. A device according to claim 1, wherein said second hitching means comprises a shaft in line with said horizontal axis, said stop member being provided with abutment means remote from said pivot and positioned for engagement of the front end of said trailer.

4. A device according to claim 3, wherein said abutment means includes latch means for interlockingly engaging said stop member with said front end of the trailer.

5. A device according to claim 1, wherein said stop member comprises a panel provided with abutment means at a location remote from its pivot.

6. A device according to claim 5, further comprising resilient spacer means on said abutment means positioned for engagement of said one of said vehicles.

7. A device according to claim 1, further comprising bracing means between said body and said stop member operable for fixedly maintaining same in a predetermined relative angular position, thereby relieving pressure upon said actuating means.

8. A device according to claim 7, wherein said bracing means comprises a rigid element hinged to said stop member and a projection on said body positioned for engagement by said element in said predetermined angular position of said stop member and of said body, said element normally overlying said projection and being adapted to drop into alignment therewith upon said predetermined position being reached.

References Cited in the file of this patent

UNITED STATES PATENTS

| | | |
|---|---|---|
| 2,515,575 | Van Langen | July 18, 1950 |
| 2,599,993 | Hill | June 10, 1952 |